(12) United States Patent  (10) Patent No.: US 6,433,905 B1
Price et al.                (45) Date of Patent:   Aug. 13, 2002

(54) FREQUENCY AGILE TRANSPONDER (75) Inventors: James N. Price, Mars; Jeffrey A. Gibala, McKeesport, both of PA (US)

(73) Assignee: Tollgrade Communications, Inc., Wilmington, DE (US)

( * ) Notice: Subject to any disclaimer, the term of this patent is extended or adjusted under 35 U.S.C. 154(b) by 0 days.

(21) Appl. No.: 09/308,356

(22) PCT Filed: Sep. 28, 1998

(86) PCT No.: PCT/US98/20545
§ 371 (c)(1),
(2), (4) Date: May 18, 1999

(87) PCT Pub. No.: WO99/17471
PCT Pub. Date: Apr. 8, 1999

Related U.S. Application Data (60) Provisional application No. 60/060,453, filed on Sep. 27, 1997.

(51) Int. Cl.$^7$ .................................................. H04B 10/00
(52) U.S. Cl. .................... 359/152; 359/110; 359/145; 725/129
(58) Field of Search ................................ 359/110, 115, 359/125, 152, 145–146, 174; 725/129; 455/73

(56) References Cited

U.S. PATENT DOCUMENTS

| | | | |
|---|---|---|---|
| 3,891,838 A | 6/1975 | Herr et al. ............. 235/153 AK |
| 4,135,202 A | 1/1979 | Cutler ......................... 358/86 |
| 4,184,056 A | 1/1980 | Basch et al. .......... 179/175.3 F |
| 4,257,033 A | 3/1981 | Ota et al. .............. 340/870.16 |
| 4,343,042 A | 8/1982 | Schrock et al. ................ 455/5 |
| 4,494,111 A | 1/1985 | Rocci et al. ................ 340/533 |
| 4,558,358 A | 12/1985 | Onda .......................... 358/86 |
| 4,833,668 A | 5/1989 | Rowley et al. ................. 370/1 |
| 4,891,694 A | 1/1990 | Way .............................. 358/86 |
| 4,994,675 A | 2/1991 | Levin et al. ................. 250/551 |
| 5,054,054 A | 10/1991 | Pessia et al. ................... 379/89 |
| 5,058,102 A | 10/1991 | Heidemann ................. 359/125 |
| 5,077,729 A | 12/1991 | Wong ......................... 359/110 |
| 5,136,411 A | 8/1992 | Paik et al. .................. 359/125 |
| 5,157,652 A | 10/1992 | Walker ........................ 370/17 |
| 5,296,956 A | 3/1994 | Fatehi et al. ................ 359/110 |
| 5,301,050 A | 4/1994 | Czerwiec et al. ........... 395/110 |
| 5,301,353 A | 4/1994 | Borras et al. .................. 455/9 |
| 5,319,485 A | 6/1994 | Yasui et al. ................. 359/128 |
| 5,335,104 A | 8/1994 | Johnson ...................... 359/110 |
| 5,367,394 A | 11/1994 | Chuter et al. ............... 359/110 |
| 5,367,395 A | 11/1994 | Yajima et al. .............. 359/110 |
| 5,383,015 A | 1/1995 | Grimes ...................... 356/73.1 |
| 5,396,569 A | 3/1995 | Yanagawa et al. ............. 385/24 |
| 5,442,472 A | 8/1995 | Skrobko ..................... 359/110 |
| 5,488,413 A | 1/1996 | Elder et al. .................. 348/13 |
| 5,491,572 A | 2/1996 | Ohara ........................ 359/110 |
| 5,493,436 A | 2/1996 | Karasawa et al. .......... 359/145 |
| 5,504,617 A | 4/1996 | Spirit ......................... 359/341 |
| 5,506,709 A | 4/1996 | Segal et al. ................. 359/110 |

(List continued on next page.)

Primary Examiner—Kinfe-Michael Negash
(74) Attorney, Agent, or Firm—Webb Ziesenheim Logsdon Orkin & Hanson, P.C.

(57) ABSTRACT

One or more pieces of equipment of a hybrid fiber-coaxial (HFC) network has a frequency agile transponder connected thereto. Each frequency agile transponder includes a transmitter (T) and a receiver (R) which are connectable to a coaxial line of the HFC network. Bidirectional communications can occur between a controller and each frequency agile transponder via the HFC network. The frequency agile transponder has analog inputs/outputs connectable to test points of the one or more pieces of equipment of the HFC network. The frequency agile transponder can test the test points and supply to the controller the results of the test. The transmit and receive center frequencies of the transmitter and receiver of the frequency agile transponder can be selectively and remotely adjusted by the controller to avoid signals at carrier frequencies utilized to transmit program material, data signals and/or telephony signals.

20 Claims, 4 Drawing Sheets

U.S. PATENT DOCUMENTS

| | | | |
|---|---|---|---|
| 5,513,029 A | 4/1996 | Roberts | 359/177 |
| 5,521,701 A | 5/1996 | Felger et al. | 356/218 |
| 5,521,751 A | 5/1996 | Aida et al. | 359/337 |
| 5,528,404 A | 6/1996 | MacKichan | 359/110 |
| 5,528,582 A | 6/1996 | Bodeep et al. | 370/24 |
| 5,539,558 A | 7/1996 | Yonemura et al. | 359/110 |
| 5,546,325 A | 8/1996 | Aulet et al. | 364/525 |
| 5,548,432 A | 8/1996 | Clarke et al. | 359/137 |
| 5,557,319 A | 9/1996 | Gurusami et al. | 348/11 |
| 5,576,877 A | 11/1996 | Aulet et al. | 359/189 |
| 5,579,145 A | 11/1996 | Bogdan et al. | 359/189 |
| 5,581,555 A | 12/1996 | Dubberly et al. | 370/487 |
| 5,585,954 A | 12/1996 | Taga et al. | 359/158 |
| 5,594,726 A * | 1/1997 | Thompson et al. | 370/485 |
| 5,598,360 A | 1/1997 | Bogdan et al. | 364/579 |
| 5,642,154 A | 6/1997 | Krishnamurthy et al. | 348/12 |
| 5,854,703 A * | 12/1998 | West, Jr. | 359/167 |
| 5,878,325 A * | 3/1999 | Dail | 455/5.1 |
| 5,963,557 A * | 10/1999 | Eng | 370/432 |
| 5,963,844 A * | 10/1999 | Dail | 455/5.1 |

* cited by examiner

FREQUENCY AGILE TRANSPONDER

This application claims the benefit of U.S. Provisonal application No. 60/060,453, filed Sep. 27, 1997.

BACKGROUND OF THE INVENTION

1. Field of the Invention

This invention relates to a tester which tests equipment of a hybrid fiber-coaxial network and, more particularly, to a tester having frequency adjustable transmit and receive frequencies.

2. Description of the Prior Art

Figure 1:
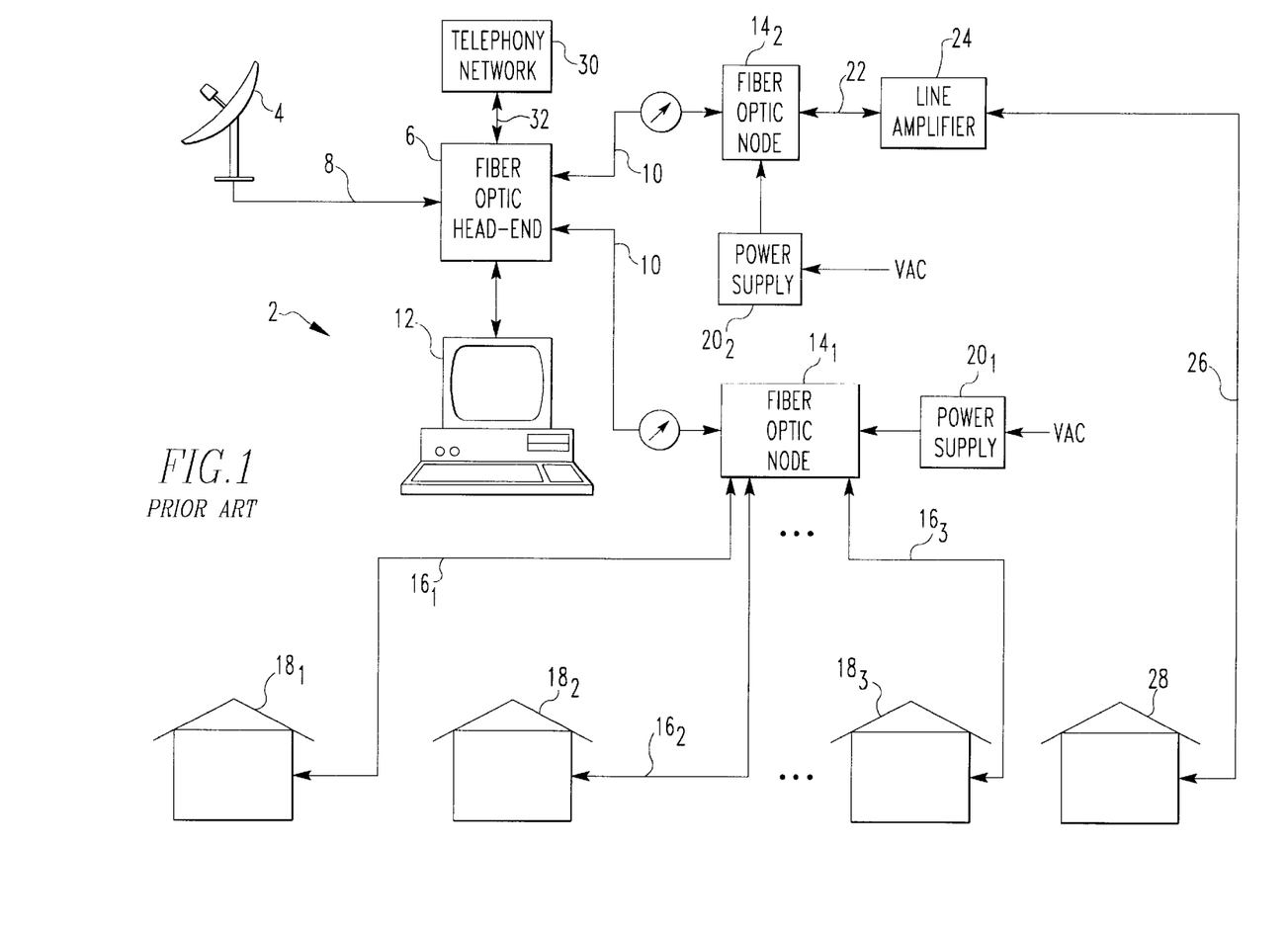
FIG. 1 is a block diagram of a prior art hybrid fiber-coaxial (HFC) network.

A typical hybrid fiber-coaxial (HFC) network 2 for communicating data, such as cable television program material, is shown in FIG. 1. The HFC network 2 includes a receiving antenna 4 which receives RF signals which include program material from a satellite or microwave transmission station (not shown) and provides the RF signals to a fiber optic head end 6 via a coaxial cable 8. The fiber optic head end 6 converts the received RF signals into optical program signals that are supplied to a fiber optic network 10. A computer 12 is connected to the fiber optic head end 6 for monitoring and controlling the operation thereof.

Connected to an end of the fiber optic network 10 opposite the fiber optic head end 6 is a fiber optic node $14_1$. The fiber optic node $14_1$ converts the optical program signals received from the fiber optic network 10 into RF program signals that are supplied via 75 ohm coaxial cables $16_1$–$16_3$ to subscribers $18_1$–$18_3$ at frequencies between 50 and 750 MHz. Connected to the fiber optic node $14_1$ is a power supply $20_1$. The power supply $20_1$ converts incoming AC power, supplied from power lines (not shown), into an AC power signal, preferably a 60 Hz square wave signal having an RMS voltage of 60 or 90 volts. The AC power signal is supplied by the power supply $20_1$ to the fiber optic node $14_1$ which includes a rectifier which converts the AC power signal into DC power usable by electronic circuitry of the fiber optic node $14_1$.

Another fiber optic node $14_2$ can be connected to the fiber optic head end 6 via the fiber optic network 10. Another power supply $20_2$, similar to power supply $20_1$, is connected between incoming AC power and the fiber optic node $14_2$. The-fiber optic node $14_2$ converts the optical program signals received from the fiber optic network 10 into RF program signals at frequencies between 50 and 750 MHz. The fiber optic. node $14_2$ supplies the RF program signals to a line amplifier 24 via a 75 ohm coaxial cable 22. The line amplifier 24 amplifies the RF program signals and supplies the amplified RF program signals to a subscriber 28 via a 75 ohm coaxial cable 26.

The power supply 202 superimposes its AC power signal on the coaxial cable 22 extending between the fiber optic node $14_2$ and the line amplifier 24. The line amplifier 24 includes a rectifier which converts the AC power signal on the coaxial cable 22 into DC power usable by electronic circuitry of the line amplifier 24. Alternatively, the power supply $20_2$ is connected to the line amplifier 24 and the fiber optic node $14_2$ receives its AC power signal from the power supply $20_2$ via the line amplifier 24 and coaxial cable 22.

A telephony network 30 supplies data signals and/or telephony signals to the fiber optic head end 6 via telephony lines 32. The fiber optic head end 6 converts the data signals and/or telephony signals received from the telephony network 30 into optical data/telephony signals that are supplied to the fiber optic network 10. One or more of the fiber optic nodes $14_1$ and $14_2$ receives the optical data/telephony signals and converts the received optical data/telephony signals into RF data/telephony signals which are supplied to the subscribers $18_1$–$18_3$ and 28 via the coaxial cables $16_1$–$16_3$ and 26 at frequencies between 50 and 750 MHz.

The subscribers $18_1$–$18_3$ and 28 can also generate RF data/telephony signals which are supplied to the fiber optic nodes $14_1$ and $14_2$ at frequencies between 5 and 40 MHz. The fiber optic nodes $14_1$ and $14_2$ convert the data signals and/or telephony signals received from the subscribers $18_1$–$18_3$ and 28 into optical data/telephony signals that are supplied to the fiber optic head end 6 via the fiber optic network 10. The fiber optic head end 6 converts the optical data/telephony signals received from the fiber optic nodes $14_1$ and $14_2$ into data signals and/or telephony signals that are supplied to the telephony network 30.

As can be seen, the HFC network 2 can be utilized to supply data signals and/or telephony signals between the telephony network 30 and subscribers $18_1$–$18_3$ and 28 and can be utilized to supply cable television program material from the antenna 4 to the subscribers $18_1$–$18_3$ and 28.

Proliferation of HFC networks has increased the need for cable service providers to quickly and accurately identify problems with equipment of such HFC networks. Specifically, if one or more pieces of equipment, such as the fiber optic nodes $14_1$ or $14_2$, the power supplies $20_1$ or $20_2$ and/or the line amplifier 24, are inoperative or are operating at a reduced performance level, the cable operator is often unaware of the problem until a subscriber reports the problem. Thereafter, a craftsperson must be dispatched to identify and repair the faulty component.

It is an object of the present invention to provide a tester which tests test points of equipment of the HFC network and which reports test results to a central data collection computer. It is an object of the present invention to provide a frequency agile tester which can be connected to test points of equipment of the HFC network and which has selectable transmit and receive frequencies which enable bidirectional communication between the tester and a central data collection computer. Still other objects of the invention will become apparent to those of ordinary skill in the art upon reading and understanding the following detailed description.

SUMMARY OF THE INVENTION

Accordingly, we have invented a frequency agile (F/A) transponder which is connectable to at least one test point of equipment of a hybrid fiber-coaxial network. The F/A transponder includes a receiver configured to be connected to a first cable of the HFC network. The receiver receives from the first cable signals modulated around a receive center frequency and obtains from the received signals receive data. A controller is connected to receive the receive data from the receiver. The controller is configured to detect an electrical condition at the at least one test point. The controller compares the detected electrical condition to a predetermined electrical condition and produces as a function of the comparison transmit data. A transmitter is connected to receive from the controller the transmit data. The transmitter is configured to produce from the transmit data signals modulated around a transmit center frequency. The transmitter supplies the signals modulated around the transmit center frequency to one of the first cable and a second cable of the HFC network. The receive center frequency and the transmit center frequency are different frequencies. In response to a frequency change signal received by the receiver on the first coaxial cable at the receive center frequency, the receiver changes to receive signals at another receive center frequency or the transmitter changes to transmit signals at another transmit center frequency.

We have also invented a hybrid fiber-coaxial (HFC) network for communicating data between a fiber optic head end and a subscriber. The HFC network includes a fiber optic node connected between a fiber optic network and a conductive cable. The fiber optic node is configured to receive optical signals via the fiber optic network and to convert the received optical signals into signals modulated around a receive center frequency. The fiber optic node supplies to the conductive cable the signals modulated around the receive center frequency. The fiber optic node also receives from the conductive cable signals modulated around a transmit center frequency and converts the received signals modulated around the transmit center frequency into optical signals that are supplied to the fiber optic network. A power supply supplies electrical power to the fiber optic node. A frequency agile transponder is connected to the conductive cable and a test point in one of the fiber optic node and the power supply. The frequency agile transponder is configured to detect an electrical condition at the test point. The frequency agile transponder receives from the conductive cable the signals modulated around the receive center frequency and supplies to the conductive cable the signals modulated around the transmit center frequency. In response to receiving via the coaxial cable a frequency change command signal modulated around the receive center frequency, the frequency agile transponder adapts itself to receive signals modulated around another receive center frequency or to supply signals modulated around another transmit center frequency.

We have also invented a method of communicating over a conductive cable of a hybrid fiber-coaxial network. In the method, a frequency change command signal modulated around a first receive center frequency is received on the conductive cable. In response to receiving the frequency change command signal, (i) the detection on the conductive cable of signals modulated around the first receive center frequency is terminated and signals modulated around a second receive center frequency are detected on the conductive cable or (ii) transmitting on the conductive cable signals modulated around the first transmit center frequency is terminated and signals modulated around a second transmit center frequency are transmitted on the conductive cable.

DESCRIPTION OF THE PREFERRED EMBODIMENT

Figure 2:
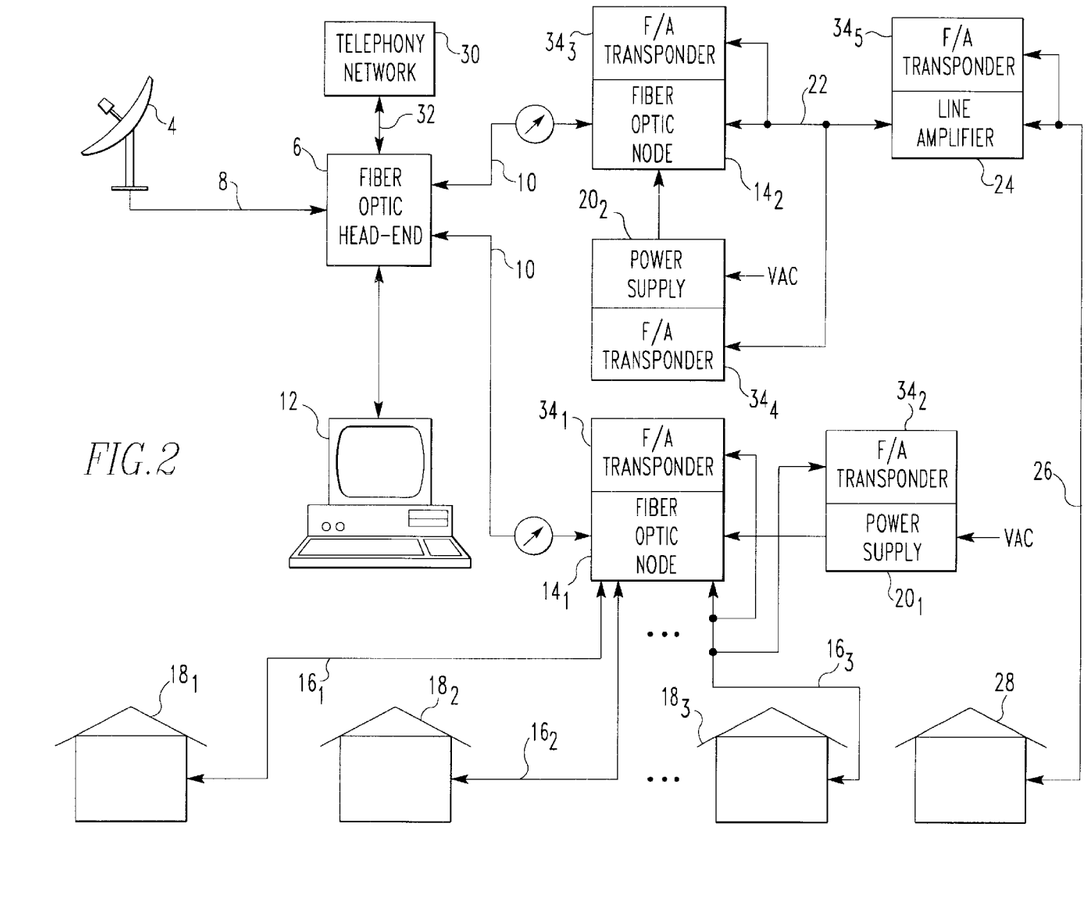
FIG. 2 is a block diagram of the HFC network of FIG. 1 including frequency agile transponders in accordance with the present invention connected to equipment of the HFC network.

With reference to FIG. 2, a receiving antenna 4 receives RF signals from a transmitting antenna (not shown) and supplies the received RF signals to a fiber optic head end 6 via a coaxial cable 8. The RF signals may include one or more program material, such as television or radio programs, transmitted in a manner known in the art. The fiber optic head end 6 converts the RF signals received from the receiving antenna 4 into corresponding optical signals that are provided to a fiber optic network 10. Connected to the fiber optic head end 6 is a computer 12 which monitors and controls the operation of the fiber optic head end 6 and provides data, such as control signals, to frequency agile (F/A) transponders, to be discussed hereinafter, and receives data therefrom.

Fiber optic nodes $14_1$ and $14_2$ are connected to the fiber optic network 10 opposite the fiber optic head end 6 Connected to the fiber optic node $14_1$ is an F/A transponder $34_1$. Also connected to the fiber optic node $14_1$ is a power supply $20_1$ that has an F/A transponder $34_2$ connected thereto. The fiber optic node $14_1$ converts optical signals received from the fiber optic head end 6 into corresponding RF signals that are supplied to one or more subscribers $18_1$–$18_3$ via coaxial cables $16_1$–$16_2$, respectively. Connected to the fiber optic node $14_2$ is an F/A transponder $34_3$ and a power supply $20_2$ that has an F/A transponder $34_4$ connected thereto. The fiber optic node $14_2$ converts optical signals received from the fiber optic head end 6 into corresponding RF signals that are supplied to a line amplifier 24 via a coaxial cable 22. The line amplifier 24 amplifies the RF signals received from the fiber optic node $14_2$ and supplies the amplified RF signals to a subscriber 28 via a coaxial line 26. The line amplifier 24 can also have an F/A transponder $34_5$ connected thereto.

A telephony network 30 is connected to supply data signals and/or telephony signals to the fiber optic head end 6 via telephony lines 32, such as fiber optic cables and/or conductive wires. The fiber optic head end 6 converts the data signals and/or telephony signals received from the telephony network 30 into corresponding optical signals that are provided to one or more of the fiber optic nodes $14_1$ or $14_2$ via the fiber optic network 10. The fiber optic node $14_1$ converts the optical signals corresponding to the data signals and/or the telephony signals supplied to the fiber optic head end 6 into corresponding RF signals that are supplied to the one or more subscribers $18_1$–$18_3$ via the coaxial cables $16_1$–$16_3$, respectively. Similarly, the fiber optic node $14_2$ converts the optical signals corresponding to the data signals and/or the telephony signals supplied to the fiber optic head end 6 into corresponding RF signals that are supplied to the line amplifier 24 via the coaxial cable 22. The line amplifier 24 amplifies the RF signals received from the fiber optic node $14_2$ and supplies the amplified RF signals to the subscriber 28 via the coaxial line 26.

RF signals corresponding to program materials received by the fiber optic head end 6 from the antenna 4 or data signals and/or telephony signals received by the fiber optic head end 6 from the telephony network 30 are supplied by the fiber optic nodes $14_1$ and $14_2$ to the subscribers $18_1$–$18_3$ and 28 at RF signal frequencies between 50 and $_{750}$ MHz. Moreover, the subscribers $18_1$–$18_3$ and 28 can generate data signals and/or telephony signals that are supplied to the fiber optic nodes $14_1$ and $14_2$ at RF signal frequencies between 5 and 40 MHz.

RF signals corresponding to data signals and/or telephony signals received from the subscribers $18_1$–$18_3$ and 28 are converted by the fiber optic nodes $14_1$ and $14_2$ into corresponding optical signals that are supplied to the fiber optic head end 6 via the fiber optic network 10. The fiber optic head end 6 converts the optical signals received from the fiber optic nodes $14_1$ and $14_2$ into corresponding data signals and/or telephony signals that are supplied to the telephony network 30 via the telephony lines 32.

The RF signals conveyed between the fiber optic nodes $14_1$–$14_2$ and the subscribers $18_1$–$18_3$ and 28 include data that is preferably frequency-shift key (FSK) modulated on a carrier signal around a desired center frequency. When a subscriber, e.g., $18_1$, and the fiber optic node $14_1$ servicing the subscriber $18_1$ are positioned proximate to each other, e.g., less than one mile, the fiber optic node $14_1$ and the subscriber $18_1$ are connected directly via the coaxial line $16_1$ extending therebetween. If, however, a subscriber, e.g., 28, and the fiber optic node $14_2$ servicing the subscriber 28 are positioned distant from each other, e.g., greater than one mile, the line amplifier 24 is utilized to amplify the RF signals transmitted between the fiber optic node $14_2$ and the subscriber 28 via the coaxial cable 26.

Each F/A transponder $34_1$–$34_5$ is configured to be connected to one or more test points of electrical or electronic circuitry of the equipment, i.e., $14_1$, $20_1$, $14_2$, $20_2$ and 24, of the HFC network 2. Moreover, each F/A transponder $34_1$–$34_5$ is configured to be connected to a coaxial cable, e.g., $16_3$, 22 or 26, for receiving from the computer 12 via one of the fiber optic nodes $14_1$ or $14_2$ RF signals, such as command signals, and for transmitting to the computer 12 via one of the fiber optic nodes $14_1$ or $14_2$ RF signals, such as test result signals.

More specifically, the computer 12 supplies command signals to the fiber optic head end 6 which converts the command signals into corresponding optical command signals which are supplied to one or more of the fiber optic nodes $14_1$ and $14_2$ via the fiber optic network 10. The one or more Fiber optic nodes $14_1$ and $14_2$ convert the optical command signals into corresponding RF command signals modulated around a center frequency between 50 and 750 MHz. The RF command signals are supplied by the one or more fiber optic nodes $14_1$ and $14_2$ to the one or more of the F/A transponders $34_1$–$34_5$ via the coaxial cables $16_3$, 22 and 26. The RF command signals include one or more unique identifiers corresponding to unique identifiers assigned to one or more of the F/A transponders $34_1$–$34_5$. In response to detecting its unique identifier on the RF command signals, the F/A transponder assigned the unique identifier decodes from the RF command signals the command signals. The RF command signals are modulated around a center frequency different than the center frequencies of the RF signals utilized to supply program materials, data signals and/or telephony signals to the subscribers $18_1$–$18_3$ and 28.

Each frequency agile transponder $34_1$–$34_5$ can supply to its corresponding fiber optic node $14_1$ or $14_2$ RF test result signals modulated around a center frequency between 5 and 40 MHz. The center frequency of the RF test result signals is selected to avoid RF signal frequencies utilized to supply data signals and/or telephony signals from the subscribers $18_1$–$18_3$ and 28 to the fiber optic nodes $14_1$ and $14_2$. The fiber optic nodes $14_1$ and $14_2$ convert the RF test result signals received thereby into corresponding optical test result signals that are supplied to the fiber optic head end 6 via the fiber optic network 10. The fiber optic head end 6 converts the received optical test result signals into the test result data that are supplied to the computer 12. The computer 12 can store the test result data for subsequent retrieval and/or generate an alarm when a particular test result data exceeds a predetermined limit.

Figure 3A:
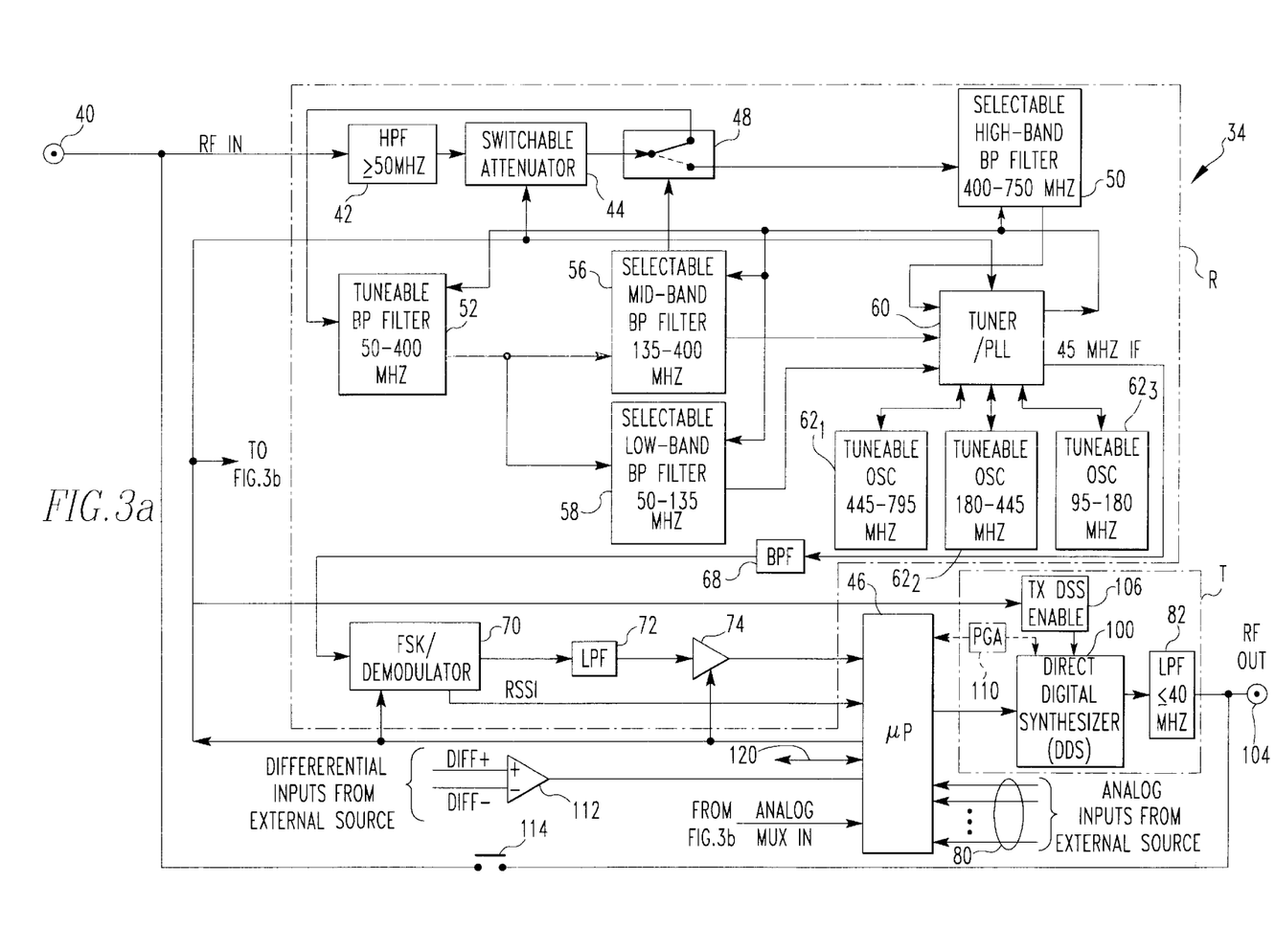
FIGS. 3a–3b are block diagrams of a frequency agile transponder of FIG. 2.
Figure 3B:
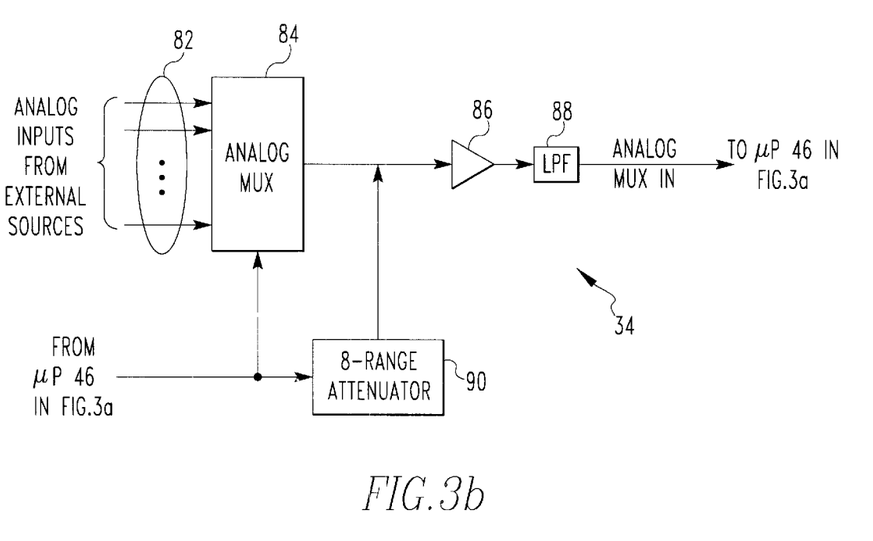

With reference to FIGS. 3a–3b, and with ongoing reference to FIG. 2, each F/A transponder 34 has a coaxial connector 40 connectable to one of the coaxial cables, e.g., $16_3$, 22 or 26. The frequency agile transponder 34 includes a receiver R which is connected to the coaxial connector 40. The receiver R includes a high-pass filter 42 which passes received RF signals having frequencies equal to or greater than 50 MHz to a switchable attenuator 44. A controller or microprocessor 46 is connected to supply to the switchable attenuator 44 one or more control signals which cause the switchable attenuator 44 to attenuate the received RF signals. Preferably, the switchable attenuator 44 provides 0 dB or 18 db of attenuation on the received RF signals. The switchable attenuator 44 supplies the attenuated RF signals to a diode switch 48, shown for convenience in FIG. 3a as a single-pole double-throw switch.

The microprocessor 46 includes internal and/or external circuitry such as a universal asynchronous receiver transmitter (UART), a central processing unit (CPU), an analog-to-digital (A/D) converter, an internal multiplexer (IMUX) and a memory, such as RAM, ROM, Flash EProm and the like, as is known in the art, but which has been omitted from FIG. 3a for simplicity of illustration. Preferably, the microprocessor 46 is a Motorola, inc. 68HC11K1 integrated circuit microprocessor.

The microprocessor 46 is connected to supply one or more control signals to the diode switch 48. In response to the one or more control signals, the diode switch 48 supplies the attenuated RF signals to a selectable high-band band-pass filter 50 or a tunable band-pass filter 52. The selectable high-band band-pass filter 50 is configured to receive RF signals having center frequencies between 400 and 750 MHz. The tunable band-pass filter 52 is configured to receive RF signals having center frequencies between 50 and 400 MHz. The microprocessor 46 causes the diode switch 48 to supply the attenuated RF signals to the selectable high-band band-pass filter 50 or the tunable band-pass filter 52 as a function of the center frequency of the RF signals the F/A transponder 34 is configured to receive.

Attenuated RF signals received by the selectable high-band band-pass filter 50 are band-pass filtered thereby and supplied to an input of a tuner 60, preferably a Siemens TVA6010 integrated circuit tuner. RF signals received by the tunable band-pass filter 52 are band-pass filtered thereby and supplied to a selectable mid-band band-pass filter 56 and a selectable low-band band-pass filter 58. The mid-band band-pass filter 56 is configured to receive RF signals having center frequencies between 135 and 400 MHz. The low-band band-pass filter 58 is configured to receive RF signals having center frequencies between 50 and 135 MHz. Attenuated RF signals received by the mid-band band-pass filter 56 are band-pass filtered thereby and supplied to an input of the tuner 60. Attenuated RF signals received by the low-band band-pass filter 58 are band-pass filtered thereby and supplied to an input of the tuner 60.

The microprocessor 46 is connected to supply to the selectable high-band band-pass filter 50 one or more control signals that cause the selectable high-band band-pass filter 50 to adjust the center frequency and/or bandwidth of the attenuated RF signals received from the diode switch 48 having center frequencies between 400 and 750 MHz. The microprocessor 46 is connected to supply to the selectable mid-band band-pass filter 56 one or more control signals that cause the selectable mid-band band-pass filter 56 to adjust the center frequency and/or bandwidth of the attenuated RF signals received from the tunable band-pass filter 52 having center frequencies between 135 and 400 MHz. The microprocessor 46 is also connected to supply to the selectable low-band band-pass filter 58 one or more control signals that cause the selectable low-band band-pass filter 58 to adjust the center frequency and/or bandwidth of the attenuated RF signals received from the tunable band-pass filter 52 having center frequencies between 50 and 135 MHz.

Connected to the tuner 60 are tunable oscillators $62_1$–$62_3$. The microprocessor 46 is connected to supply to the tuner 60 one or more control signals that cause the tuner 60 to select the oscillator $62_1$, $62_2$ or $62_3$ which is to be utilized to demodulate the RF signals provided to the tuner 60 via one of the selectable band-pass filters 50, 56 or 58. The one or more control signals also cause the tuner 60 to tune the selected oscillator $62_1$, $62_2$ or $62_3$ to a selected center frequency. An oscillator $62_1$, $62_2$ or $62_3$ and its center frequency are selected based upon the center frequency of the RF signals the F/A transponder 34 is configured to receive.

In response to control signals from the microprocessor 46, the center frequency of (i) the selected oscillator $62_1$, $62_2$ or $62_3$, (ii) the tunable band-pass filter 52 and/or (iii) the selectable band-pass filters 50, 56 and/or 58 are adjusted to the center frequency of the RF signals the receiver R of the F/A transponder 34 is configured to receive. For example, if the receiver R is configured to receive RF signals modulated around a center frequency of 750 MHz, the microprocessor 46 causes the tuner 60 to select the tunable oscillator $62_1$ and to adjust the tunable oscillator $62_1$ to a center frequency of 795 MHz. The microprocessor 46 also causes the selectable high-band band-pass filter 50 to adjust to a frequency of 750 MHz. Moreover, the microprocessor 46 causes the diode switch 48 to adjust so that the attenuated RF signals from the switchable attenuator 44 are supplied to the selectable high-band band-pass filter 50.

The tuner 60 heterodynes, or mixes, the band-pass filtered RF signals received from one of the selectable band-pass filters 50, 56 or 58 with the signal output by the selected tunable oscillator, e.g., $62_1$, to produce from an intermediate frequency (IF) section of the tuner 60 a 45 MHz IF signal. The 45 MHz IF signal is supplied to a band-pass filter 68 which band-pass filters the 45 MHz IF signal at 45 MHz and which notch filters the 45 MHz IF signal at 23.7 MHz image frequency.

The notched and filtered 45 MHz IF signal is provided to an FSK/demodulator 70, preferably a Phillips SA636 integrated circuit FSK/demodulator which includes a mixer, an IF amplifier and a quadrature demodulator. The FSK/demodulator 70 demodulates the notched and filtered 45 MHz IF signal and produces at its output a stream of digital data corresponding to the FSK data modulated on the RF signals received by the receiver R. The FSK/demodulator 70 supplies the stream of digital data to a low-pass filter 72 which removes high frequency noise on the stream of digital data and provides the filtered stream of digital data to an amplifier 74. The amplifier 74 amplifies the filtered stream of digital data and supplies the amplified and filtered stream of digital data to an input of the microprocessor 46 which is connected to the UART of the microprocessor 46. In a manner known in the art, the UART converts the stream or digital data into parallel data which is supplied to the CPU of the microprocessor 46 for processing.

The FSK/demodulator 70 also provides to the microprocessor 46 a received signal strength indicator (RSSI) indicative of the power level of the notched and filtered 45 MHz IF signal received by the FSK/demodulator 70. If the power level of the notched and filtered 45 MHz IF signal is above a desired level, the microprocessor 46 supplies to the switchable attenuator 44 a control signal which causes the switchable attenuator 44 to attenuate the RF signal received from the high-pass filter 42. Attenuating the RF signal received by the switchable attenuator 44 from the high-pass filter 42 attenuates the notched and filtered 45 MHz IF signal received by the FSK/demodulator 70 from the band-pass filter 68.

To conserve power when the F/A transponder 34 is transmitting data, the microprocessor 46 can selectively disable the FSK/demodulator 70. The microprocessor 46 can also provide to the amplifier 74 one or more control signals that cause the amplifier 74 to adjust the extent the stream of digital data is amplified.

The microprocessor 46 includes analog inputs that are connectable to analog lines 80. The analog lines 80 are connectable to external sources, such as test points of electronic and electrical circuitry of the equipment $14_1$, $14_2$, $20_1$, $20_2$ and 24. The microprocessor 46 also includes a multiplexed analog input that is connectable to a plurality of analog lines 82, shown in FIG. 3b, via an analog multiplexer 84. The microprocessor 46 is connected to supply one or more control signals to the analog multiplexer 84. In response to the one or more control signals, the analog multiplexer 84 selectively connects one of the analog lines 82 to an input of an amplifier 86 which has an output connected to an input of a low-pass filter 88. The output of the low-pass filter 88 is connected to the multiplexed analog input of the microprocessor 46.

An attenuator 90 is connected between the analog multiplexer 84 and the amplifier 86. The microprocessor 46 is connected to supply to the attenuator 90 one or more control signals which cause the attenuator 90 to selectively attenuate the analog signals supplied to the amplifier 86. Moreover, the microprocessor 46 can supply to the attenuator 90 one or more control signals which cause the attenuator 90 to correct for undesired DC offset in the analog signals supplied to the amplifier 86.

The analog inputs of the microprocessor 46 connectable to the analog lines 80 and 82 are selectively connectable to the A/D converter of the microprocessor 46 via the IMUX of the microprocessor 46. Under the control of the CPU of the microprocessor 46, the A/D converter converts the analog signals received from the IMUX into digital signals that are supplied to the CPU for processing.

The F/A transponder 34 includes a transmitter T which has a direct digital synthesizer (DDS) 100, preferably an Analog Devices AD9850 integrated circuit DDS. The microprocessor 46 is connected to supply to the DDS 100 transmit data which causes the DDS 100 to produce an RF signal at a first frequency or an RF signal at a second frequency. More specifically, the microprocessor 46 supplies to the DDS 100 first transmit data which causes the DDS 100 to generate an RF signal at the first frequency and supplies to the DDS 100 second transmit data which causes the DDS 100 to generate an RF signal at the second frequency. Preferably, the first frequency and the second frequency are 134 KHz apart and centered about a desired transmit center frequency between 5 and 40 MHz. Preferably, the DDS 100 does not generate the center frequency.

The RF signals generated by the DDS 100 are provided to a low-pass filter 102 which low-pass filters the received RF signals at or below 40 MHz and supplies the filtered RF signals to an output RF coaxial connector 104. To conserve power when not transmitting data, the transmitter T includes a transmit DDS enable circuit 106 connected between the microprocessor 46 and the DDS 100. Under the control of the microprocessor 46 the DDS enable circuit 106 can selectively enable or disable the DDS 100. When disabled, the DDS 100 does not generate an RF signal.

The transmit data supplied to the DDS 100 corresponds to digital data produced by the microprocessor 46 during operation. For example, the microprocessor 46 samples an electrical condition at a test point via one of the analog lines 80 and 82. The sampled electrical condition is converted by the A/D converter of the microprocessor 46 into corresponding digital data that is supplied to the CPU of the microprocessor 46 and compared to reference digital data stored in the memory of the microprocessor 46. The reference digital data stored in the memory of the microprocessor 46 corresponds to a predetermined analog electrical condition at the test point. The microprocessor 46 produces, as a result of the comparison, comparison digital data.

In order for the DDS 100 to transmit RF signals corresponding to the comparison digital data, the microprocessor converts the comparison digital data into the transmit data supplied to the DDS. More specifically, the microprocessor converts each bit of comparison digital data having a binary value of 0 into the first transmit data and converts each bit of comparison digital data having a binary value of 1 into the second transmit data. The first transmit data includes a first plurality of control bytes which cause the DDS 100 to produce the RF signal at the first frequency. The second transmit data includes a second plurality of control bytes which cause the DDS 100 to produce the RF signal at the second frequency. When it is desired to communicate digital data to the transmitter T, the microprocessor converts the digital data into the transmit data.

Alternatively, a programmable gate array (PGA) 110, shown in phantom in FIG. 3a, is connected between the microprocessor 46 and the DDS 100. The PGA 110, preferably a Xilinx XC5202 integrated circuit PGA, is configured to receive from the microprocessor 46 the comparison digital data to be transmitted by the transmitter T. The PGA converts each binary value of 0 or a binary value of 1 received from the microprocessor 46 into the corresponding first transmit data and second transmit data which cause the DDS synthesizer 100 to switch between the first frequency and the second frequency.

To reduce spectral effects caused by switching the DDS synthesizer 100 between the first frequency and the second frequency, the microprocessor 46 or the PGA 110 causes the DDS 100 to switch between the first. frequency and the second frequency in discreet steps, e.g., stairsteps.

The microprocessor 46 can adjust the gain of the DDS 100 by adjusting a resistance value of an external resistor (not shown) or by adjusting a resistance value of a resistor internal the DDS 100. Adjusting the resistance value enables the output of the DDS synthesizer 100 to be matched to an input impedance of upstream equipment, i.e., a fiber optic node 14.

In the above-described embodiment, coaxial connectors 40 and 104 are utilized to connect the respective receiver R and transmitter T to separate coaxial cables. If, however, it is desired to utilize one coaxial cable to transmit and receive data, a connection is formed between the output of the transmitter T and the coaxial connector 40 through a jumper 114. If it is desired to utilize the coaxial connector 40 to transmit and receive data, the jumper 114 is installed. If it is desired to utilize the coaxial connector 40 to receive data and the coaxial connector 104 to transmit data, the jumper 114 is not installed.

In use of the F/A transponder 34, one or more of the analog inputs 80 and 82 are connected to one or more test points of electronic or electrical circuitry of equipment, such as a fiber optic node 14, a power supply 20 or a line amplifier 24, of the HFC network 2 to detect electrical conditions at these one or more test points. The microprocessor 46, under the control of a software control program stored in the memory of the microprocessor 46, detects an electrical condition, e.g., a voltage, at the one or more test points, compares the detected electrical condition to a predetermined condition for the one or more test points and generates one or more comparison digital data in response to the comparison. The transmitter T of the F/A transponder 34 converts the one or more comparison digital data into corresponding RF signals that are supplied to the computer 12 via one of the fiber optic nodes 14.

When an F/A transponder 34 is installed to monitor one or more test points in equipment, the transmit and receive center frequencies of the transmitter T and the receiver R, respectively, and the unique identifier are programmed into the memory of the microprocessor 46 via the UART, or a craft access, of the microprocessor 46. The receive center frequency programmed into the memory causes the microprocessor 46 to configure the receiver R to receive RF signals around the receive center frequency. Similarly, the transmit center frequency programmed into the memory causes the microprocessor 46 to provide to the DDS 100 transmit data which causes the DDS 100 to supply RF signals around the transmit center frequency. If the transmitter T includes the PGA 110, the microprocessor 46 programs the PGA 110 to provide to the DDS 100 transmit data which causes the DDS 100 to supply RF signals around the transmit center frequency. The transmit and receive center frequencies of the F/A transponder 34 are selected to coincide with the respective receive and transmit center frequencies generated by the fiber optic node 14 in response to communications from the computer 12. The unique identifier programmed into the memory of the microprocessor 46 of the F/A transponder 34 enables the computer 12 to selectively communicate with a desired F/A transponder 34. When the F/A transponder 34 is installed, communications can occur between the computer 12 and the F/A transponder 34 via the fiber optic head end 6, the fiber optic network 10, the fiber optic node 14 and a coaxial line, e.g., $16_3$, utilized to provide program material to one or more subscribers.

If, after installation of the F/A transponder 34, it is desired to change the receive center frequencies of the RF signals detected by the receiver R from a first receive center frequency to a second receive center frequency, the computer 12 causes a frequency change command signal to be supplied to the F/A transponder 34 at the first receive center frequency. The frequency change command signal includes data corresponding to the second receive center frequency. In response to receiving the data corresponding to the second receive center frequency, the microprocessor 46 causes the tuner 60 to change the center frequency of the RF signals detected by the receiver R to the second receive center frequency. After causing the frequency change command signal to be supplied to the F/A transponder 34, the computer 12 communicates to the F/A transponder 34 via the fiber optic node 14 at the second center frequency. In this manner, the center frequency of the RF signals utilized to communicate with the receiver R can be remotely adjusted to avoid RF signals utilized to convey program material, data signals and/or telephony signals. Similarly, the frequency change command signal can be utilized to adjust the center frequency of the RF signals transmitted by the transmitter T to avoid RF signals utilized to convey data signals and/or telephony signals on the coaxial cable and to optimize communication between the computer 12 and the F/A transponder 34.

In a preferred embodiment, each F/A transponder $34_1$–$34_5$ can communicate with the computer 12 in response to the computer 12 polling the respective F/A transponder $34_1$–$34_5$. Alternatively, each F/A transponder $34_1$–$34_5$ can initiate communication with the computer 12 in response to an alarm condition, such as, for example, the absence of AC power at the input to a power supply 20.

To enable measurement of output current supplied by a power supply 20, the F/A transponder 34 includes a differential amplifier 112 having inputs connectable across a series sense resistor (not shown) positioned in an output line of the power supply 20. An output of the differential amplifier 112 is connected to an analog input of the microprocessor 46. The output of the differential amplifier 112 can be selectively connected to the A/D converter of the microprocessor 46 via the IMUX of the microprocessor 46. Under the control of the CPU of the microprocessor 46, the A/D converter converts the analog signal from the differential amplifier 112 into a digital signal that is supplied to the CPU for processing.

As discussed above, one or more of the analog lines 80 and 82 can be connected to test points of electronic or electrical circuitry of the power supply 20 to enable the microprocessor 46 to detect, for example, the status of standby mode batteries utilized to supply power in the absence of incoming AC voltage, the presence or absence of incoming AC voltage and/or the voltage or current output by the power supply. Similarly, one or more of the analog lines 80 and 82 can be connected to test points of electronic or electrical circuitry of the fiber optic node 14 to enable the microprocessor 46 to detect, for example, the output of a temperature sensor positioned in a housing containing the electronic circuitry of the fiber optic node 14 and/or the presence or absence of AC voltage from the power supply 20 connected to the fiber optic node 14. Moreover, the one or more analog lines 80 and 82 can be connected to test points of electronic or electrical circuitry of the line amplifier 24 to enable the microprocessor 46 to detect the gain of the line amplifier 24, the RF power into or out of the line amplifier 24 and the presence or absence of AC voltage to the line amplifier 24 from the power supply 20.

The F/A transponder 34 also includes one or more lines 120 connected between digital inputs/outputs of the microprocessor 46 and one or more binary outputs/inputs of equipment of the HFC network 2. The digital inputs/outputs of the microprocessor 46 can, for example, be utilized to switch the power supply 20 into a standby mode to enable checking of the standby mode batteries via the analog lines 80 or 82, to control upstream or reverse channel switches (not shown) of the HFC network 2, to disconnect noise inducing circuits from the HFC network 2 to select external switches, to detect tamper switches or alarms, to detect digital signals output by the line amplifier 24 or the fiber optic node 14 indicative of faults therein and/or to detect the configuration of the fiber optic node 14 and/or line amplifier 24.

The invention has been described with reference to the preferred embodiment. Obvious modifications and alterations will occur to others upon reading and understanding the preceding detailed description. For example, one F/A transponder 34 can be connected to test points in one or more of the equipment of the HFC network 2, such as the fiber optic nodes 14$_1$ and 14$_2$, the power supplies 20$_1$ and 20$_2$ or the line amplifier 24. It is intended that the invention be construed as including all such modifications and alterations insofar as they come within the scope of the appended claims or the equivalents thereof.

We claim:

1. A frequency agile (F/A) transponder connectable to at least one test point of equipment of a hybrid fiber-coaxial (HFC) network, the F/A transponder comprising:

a receiver configured to be connected to a first cable of an HFC network, to receive from the first cable signals around a receive center frequency and to obtain from the received signals receive data;

a controller connected to receive the receive data from the receiver, with the controller configured to detect an electrical condition at the at least one test point, to compare the detected electrical condition to a predetermined electrical condition and to produce transmit data as a function of the comparison; and a transmitter connected to receive from the controller the transmit data, with the transmitter configured to produce from the transmit data signals around a transmit center frequency and to supply the signals around the transmit center frequency to one of the first cable and a second cable of the HFC network, wherein:

the receive center frequency and the transmit center frequency are different frequencies; and in response to a frequency change command signal received by the receiver on the first cable at the receive center frequency, at least one of (i) the receiver changes to receive signals at another receive center frequency and (ii) the transmitter changes to transmit signals at another transmit center frequency.

2. The F/A transponder as set forth in claim 1, wherein:

the transmit data includes first transmit data and second transmit data;

as a function of the comparison, the controller produces comparison digital data having at least one binary bit;

the controller converts each bit of comparison digital data having a binary value of 0 into the first transmit data and converts each bit of comparison digital data having a binary value of 1 into the second transmit data; and the transmitter converts each first transmit data into a first frequency and converts each second transmit data into a second frequency, with the first frequency one of greater than and less than the transmit center frequency and with the second frequency the other of greater than and less than the transmit center frequency.

3. The F/A transponder as set forth in claim 1, wherein the receiver includes:

at least one band-pass filter configured to be connected to the first cable, to be tuned via the controller to receive the signals at the receive center frequency, and to band-pass filter the received signals;

at least one adjustable oscillator which produces oscillator signals;

a tuner connected to the at least one adjustable oscillator and the at least one band-pass filter, with the tuner configured to adjust the frequency of the oscillator signals of the at least one adjustable oscillator to a mixing frequency, to receive from the at least one band-pass filter the band-pass filtered signals, and to heterodyne the band-pass filtered signals and the oscillator signals at the mixing frequency to produce IF signals; and a demodulator connected to receive from the tuner the IF signals, with the demodulator configured to demodulate from the IF signal the receive data and to provide the receive data to the controller.

4. The F/A transponder as set forth in claim 1, wherein the transmitter includes:

a direct digital synthesizer (DDS) connected to receive from the controller the transmit data, with the DDS configured to convert the transmit data into the signals around the transmit center frequency; and a low-pass filter connected to receive from the DDS the signals around the transmit center frequency, with the low-pass filter configured to low-pass filter the signals around the transmit center frequency and to provide the low-pass filtered signals around the transmit center frequency to the one of the first cable and the second cable.

5. The F/A transponder as set forth in claim 4, wherein the transmitter further includes an enable circuit connected between the controller and the DDS, with the enable circuit configured to one of enable and disable the DDS in response to receiving a control signal from the controller.

6. The F/A transponder as set forth in claim 4, wherein:
in response to the comparison, the controller produces comparison digital data;
the transmitter further includes a programmable gate array (PGA) connected between the controller and the DDS;
the PGA is connected to receive from the controller the comparison digital data; and
the PGA is configured to convert the comparison digital data into the transmit data.

7. The F/A transponder as set forth in claim 1, further including:
an analog multiplexer connected between an analog input of the controller and the at least one test point, with the analog multiplexer configured to connect the at least one test point to the analog input of the controller; and
an attenuator connected between the analog multiplexer and the analog input of the controller, with the attenuator configured to attenuate an electrical condition at the at least one test point.

8. The F/A transponder as set forth in claim 1, wherein the controller has an analog input connected to detect an electrical condition at the at least one test point.

9. A hybrid fiber-coaxial (HFC) network for communicating data between a fiber optic head end and a subscriber, the HFC network comprising:
a fiber optic network;
a conductive cable;
a fiber optic node connected between the fiber optic network and the conductive cable, with the fiber optic node configured to receive via the fiber optic network optical signals, to convert the received optical signals into signals around a receive center frequency, to supply to the conductive cable the signals around the receive center frequency, to receive from the conductive cable signals around a transmit center frequency and to convert the received signals around the transmit center frequency into optical signals that are supplied to the fiber optic network;
a power supply configured to supply electric power to the fiber optic node; and
a frequency agile (F/A) transponder connected to the conductive cable and a test point in one of the fiber optic node and the power supply, with the F/A transponder configured to detect an electrical condition at the test point, to receive from the conductive cable the signals around the receive center frequency, and to supply to the conductive cable the signals around the transmit center frequency, wherein:
in response to receiving via the conductive cable a frequency change command signal at the receive center frequency, the F/A transponder adapts itself to at least one of (i) receive signals around another receive center frequency and (ii) to supply signals around another transmit center frequency.

10. The HFC network as set forth in claim 9, wherein the F/A transponder includes:

a receiver configured to be connected to the conductive cable, to receive from the conductive cable the signals around the receive center frequency, and to obtain from the signals around the receive center frequency receive data;
a controller connected to receive from the receiver the receive data, with the controller configured to detect the electrical condition at the test point and to produce as a function of the detected electrical condition transmit data; and
a transmitter connected to receive from the controller the transmit data, with the transmitter configured to produce from the transmit data the signals around the transmit center frequency and to supply to the conductive cable the signals around the transmit center frequency.

11. The HFC network as set forth in claim 10, wherein the receiver includes:
a band-pass filter connected to the controller, with the band-pass filter configured to be connected to the conductive cable, to be tuned via the controller to receive the signals around the receive center frequency and to band-pass filter the received signals around the receive center frequency;
an oscillator configured to be adjusted via the controller to a mixing frequency and to supply oscillator signals at the mixing frequency;
a tuner connected to the band-pass filter and the oscillator, with the tuner configured to receive from the band-pass filter the band-pass filtered signals around the receive center frequency, to receive from the oscillator the oscillator signals at the mixing frequency and to heterodyne the band-pass filtered signals around the receive center frequency and the oscillator signals at the mixing frequency to produce IF signals; and
a demodulator connected to receive the IF signals from the tuner, with the demodulator configured to obtain from the IF signals the receive data and to supply the receive data to the controller.

12. The F/A transponder as set forth in claim 10, wherein the transmitter includes:
a direct digital synthesizer (DDS) connected to receive from the controller the transmit data, with the DDS configured to convert the transmit data into the signals around the transmit center frequency; and
a low-pass filter connected to receive from the DDS the signals around the transmit center frequency, with the low-pass filter configured to low-pass filter the signals around the transmit center frequency and to supply the filtered signals around the transmit center frequency to the conductive cable.

13. The F/A transponder as set forth in claim 12, wherein:
in response to the detected electrical condition, the controller produces comparison digital data;
the transmitter further includes a programmable gate array (PGA) connected between the controller and the DDS;
the PGA is connected to receive from the controller the comparison digital data; and
the PGA is configured to convert the comparison digital data into the transmit data.

14. The HFC network as set forth in claim 9, further including:
a fiber optic head end connectable to an end of the fiber optic network opposite the fiber optic node, with the fiber optic head end configured to convert optical signals into electrical signals, and vice versa; and a subscriber connectable to an end of the conductive cable opposite the fiber optic node.

15. The HFC network as set forth in claim 14, further including a line amplifier connected to the conductive cable between the fiber optic node and the subscriber.

16. A method of communicating over a conductive cable of a hybrid fiber-coaxial (HFC) network, the method comprising the steps of:

(a) receiving on the conductive cable a frequency change command signal modulated around a first receive center frequency; and in response to receiving the frequency change command signal, at least one of:

(b) (i) terminating detecting on the conductive cable signals modulated around the first receive center frequency; and (ii) detecting on the conductive cable signals modulated around a second receive center frequency; and (c) (i) terminating transmitting on the conductive cable signals modulated around a first transmit center frequency; and (ii) transmitting on the conductive cable signals modulated around a second transmit center frequency.

17. The method as set forth in claim 16, further including the steps of:

detecting on the conductive cable signals modulated around the first receive center frequency; and transmitting on the conductive cable signals modulated around the first transmit center frequency.

18. The method as set forth in claim 16, further including the steps of:

converting first optical signals into the signals modulated around the first receive center frequency; and converting signals modulated around the first transmit center frequency into second optical signals.

19. The method as set forth in claim 16, further including the steps of:

converting program material into first optical signals;

converting the first optical signals into signals modulated around a third receive center frequency; and transmitting on the conductive cable the signals modulated around the third receive center frequency.

20. The method as set forth in claim 19, further including the steps of:

converting at least one of voice signals and data signals into signals modulated around a third transmit center frequency;

supplying to the conductive cable the signals modulated around the third transmit center frequency; and detecting on the conductive cable the signals modulated around the third transmit center frequency.

* * * * *

UNITED STATES PATENT AND TRADEMARK OFFICE
CERTIFICATE OF CORRECTION

PATENT NO. : 6,433,905 B1 Page 1 of 1
DATED : August 13, 2002
INVENTOR(S) : James N. Price et al.

It is certified that error appears in the above-identified patent and that said Letters Patent is hereby corrected as shown below:

Column 1,
Line 47, "optic. Node" should read -- optic node --.
Line 53, "202" should read -- $20_2$ --.

Column 4,
Lines 9-10, "6 Connected" should read -- 6. Connected --.
Line 16, "$16_1$-$16_2$" should read -- $16_1$-$16_3$ --.
Line 52, "and $_{750}$" should read -- and 750 --.

Column 6,
Line 16, "Motorola, inc." should read -- Motorola, Inc. --.

Column 7,
Lines 62-63, "high-pass.filter" should read -- high-pass filter --.

Signed and Sealed this

Fourteenth Day of January, 2003

JAMES E. ROGAN
*Director of the United States Patent and Trademark Office*